(12) United States Patent
Suryanarayanan et al.

(10) Patent No.: US 10,479,577 B2
(45) Date of Patent: Nov. 19, 2019

(54) PRINTED MULTILAYER POLYMERIC FILMS AND METHODS OF MANUFACTURE AND USE THEREOF

(71) Applicant: Printpack Illinois, Inc., Elgin, IL (US)

(72) Inventors: Rajesh Suryanarayanan, Powder Springs, GA (US); Jeffrey Boekeloo, Acworth, GA (US)

(73) Assignee: Printpack Illinois, Inc., Elgin, IL (US)

( * ) Notice: Subject to any disclaimer, the term of this patent is extended or adjusted under 35 U.S.C. 154(b) by 100 days.

(21) Appl. No.: 15/548,314

(22) PCT Filed: Feb. 11, 2016

(86) PCT No.: PCT/US2016/017444
§ 371 (c)(1),
(2) Date: Aug. 2, 2017

(87) PCT Pub. No.: WO2016/137750
PCT Pub. Date: Sep. 1, 2016

(65) Prior Publication Data
US 2018/0016072 A1    Jan. 18, 2018

Related U.S. Application Data

(60) Provisional application No. 62/119,777, filed on Feb. 23, 2015.

(51) Int. Cl.
*B65D 65/42* (2006.01)
*B41M 1/30* (2006.01)
(Continued)

(52) U.S. Cl.
CPC .............. *B65D 65/42* (2013.01); *B32B 7/08* (2013.01); *B32B 15/08* (2013.01); *B32B 27/08* (2013.01);
(Continued)

(58) Field of Classification Search
CPC ........ B65D 65/42; B65D 75/06; C09D 11/50; C08J 7/04; C08J 2300/00; B41M 1/30;
(Continued)

(56) References Cited

U.S. PATENT DOCUMENTS 6,187,444 B1  2/2001  Bowles, III et al.
2005/0012081 A1  1/2005  Yasuda et al.
(Continued)

FOREIGN PATENT DOCUMENTS

JP         0327788 A2    8/1989

OTHER PUBLICATIONS

International Search Report and Written Opinion for PCT/US2016/017444, dated May 11, 2016.

*Primary Examiner* — Bijan Ahvazi
(74) *Attorney, Agent, or Firm* — Eversheds Sutherland (US) LLP

(57) ABSTRACT

Printed multilayer polymeric films are provided that include a flexible polymeric film layer, one or more non-photochromic layers each including a solvent-based ink composition having one or more non-photochromic inks that are at least partially transparent to ultraviolet radiation, and one or more photochromic layers each including a water-based ink composition having one or more photochromic inks that undergo a color change upon exposure to ultraviolet radiation. Also provided are methods for making the printed multilayer polymeric films. Packages for containing a product therein that include the printed multilayer polymeric films are also provided. Methods for making the packages and methods for packaging a product that employ the printed multilayer polymeric films are also provided. Rolls of film for forming the packages that include the printed multilayer polymeric films are also provided.

25 Claims, 6 Drawing Sheets

(51) Int. Cl.
  *C08J 7/04*  (2006.01)
  *B65B 9/15*  (2006.01)
  *B41M 3/00*  (2006.01)
  *C09D 11/50*  (2014.01)
  *B32B 27/08*  (2006.01)
  *B65B 61/02*  (2006.01)
  *B65D 75/06*  (2006.01)
  *B32B 7/08*  (2019.01)
  *B32B 15/08*  (2006.01)
  *B32B 27/10*  (2006.01)
  *B32B 27/32*  (2006.01)
  *B32B 27/34*  (2006.01)
  *B32B 27/36*  (2006.01)
  *B32B 29/00*  (2006.01)
  *B65D 75/12*  (2006.01)

(52) U.S. Cl.
  CPC .............. *B32B 27/10* (2013.01); *B32B 27/32* (2013.01); *B32B 27/34* (2013.01); *B32B 27/36* (2013.01); *B32B 29/00* (2013.01); *B41M 1/30* (2013.01); *B41M 3/008* (2013.01); *B65B 9/15* (2013.01); *B65B 61/025* (2013.01); *B65D 75/06* (2013.01); *C08J 7/04* (2013.01); *C08J 7/042* (2013.01); *C09D 11/50* (2013.01); *B32B 2255/10* (2013.01); *B32B 2255/205* (2013.01); *B32B 2270/00* (2013.01); *B32B 2307/31* (2013.01); *B32B 2307/546* (2013.01); *B32B 2307/732* (2013.01); *B32B 2307/75* (2013.01); *B32B 2439/00* (2013.01); *B32B 2553/00* (2013.01); *B65D 75/12* (2013.01); *C08J 2300/00* (2013.01)

(58) Field of Classification Search
  CPC . B32B 27/08; B32B 2255/10; B32B 2307/75; B32B 2307/546; B32B 2439/00; B32B 2553/00; B65B 9/15; B65B 61/025
  See application file for complete search history.

(56) References Cited

U.S. PATENT DOCUMENTS

| | | | |
|---|---|---|---|
| 2007/0001327 A1* | 1/2007 | Chiu | B29D 11/00009 264/1.7 |
| 2010/0183830 A1* | 7/2010 | Berbert | B32B 7/06 428/34.8 |
| 2010/0233485 A1* | 9/2010 | Mori | C09K 9/02 428/413 |
| 2010/0237603 A1* | 9/2010 | Waning | B41M 3/144 283/67 |
| 2013/0305947 A1 | 11/2013 | Iftime et al. | |

* cited by examiner

PRINTED MULTILAYER POLYMERIC FILMS AND METHODS OF MANUFACTURE AND USE THEREOF

CROSS REFERENCE TO RELATED APPLICATIONS

This application claims priority to U.S. Provisional Application No. 62/119,777, filed on Feb. 23, 2015, the disclosure of which is incorporated herein by reference, and PCT Patent Application No. PCT/US2016/017444, filed Feb. 11, 2016 and published as WO 2016/137750, which is incorporated by reference in its entirety.

TECHNICAL FIELD

This present disclosure is generally in the field of packaging material, and more particularly to printed multilayer polymeric films and packages made therefrom, which, for example, may include photochromic and non-photochromic inks.

BACKGROUND

Photochromic inks are known and exhibit a change in light transmissions or color in response to exposure to ultraviolet radiation. Some photochromic inks exhibit a reversible change in which removal of the incident ultraviolet radiation causes the inks to revert back to their original transmissive state. Numerous photochromic inks have been developed for various product applications over the years, such as security and authenticity labels for documents and color and graphic schemes for product packaging material.

Most, if not all, commercialized photochromic inks are water-based inks, which present printing issues when these photochromic inks are printed in combination with non-photochromic solvent-based inks. For example, wet or semi-wet non-photochromic solvent-based inks that intermingle with wet or semi-wet photochromic water-based inks will breakdown the photochromic pigments, thereby altering or destroying the capabilities of the photochromic inks to change color when exposed to ultraviolet radiation.

Furthermore, packaging material that includes both photochromic water-based and non-photochromic solvent-based inks printed thereon often have "dirty" or unacceptable color and graphic schemes rendering commercially nonviable resulting printed packaging material.

Accordingly, there exists a need to provide improved printed packaging material having color and graphic schemes formed of both photochromic water-based inks and non-photochromic solvent-based inks and suitable methods for manufacturing these printed packaging materials that are capable of ameliorating some or all of the foregoing disadvantages.

SUMMARY

In one aspect, printed multilayer polymeric films are provided. In one embodiment, the printed multilayer polymeric film includes a flexible polymeric film layer, one or more non-photochromic layers, and one or more photochromic layers, in which at least a portion of the one or more non-photochromic layers are located between the flexible polymeric film layer and at least a portion of the one or more photochromic layers. In another embodiment, the printed multilayer film includes a flexible polymeric film layer, one or more non-photochromic layers that are applied on one or more portions of the flexible polymeric film layer, one or more photochromic layers that are applied on another one or more portions of the flexible polymeric film layer, an extruded resin layer, and a base substrate, wherein the extruded resin layer is located between the base substrate and the one or more non-photochromic layers and the one or more photochromic layers, and the one or more non-photochromic layers and the one or more photochromic layers are located between the extruded resin layer and the flexible polymeric film layer. In both embodiments, the one or more non-photochromic layers each include a solvent-based ink composition having one or more non-photochromic inks that are at least partially transparent to ultraviolet radiation and the one or more photochromic layers each include a water-based ink composition having one or more photochromic inks that undergo a color change upon exposure to ultraviolet radiation.

In another aspect, methods for fabricating a printed multilayer polymeric film are provided. In one embodiment, the method includes applying one or more non-photochromic layers on a flexible polymeric film layer and overlaying one or more photochromic layers on at least a portion of the one or more non-photochromic layers, in which at least a portion of the one or more non-photochromic layers are located between the flexible polymeric film and at least a portion of the one or more photochromic layers. In another embodiment, the methods includes applying one or more non-photochromic layers on at least a portion of a flexible polymeric film, overlaying one or more photochromic layers on at least another portion of the flexible polymeric film layer, and extruding a resin layer between a base substrate and the one or more non-photochromic layers and the one or more photochromic layers, and wherein the one or more non-photochromic layers and the one or more photochromic layers are located between the extruded resin layer and the flexible polymeric film layer. In both embodiments, the one or more non-photochromic layers each include a solvent-based ink composition having one or more non-photochromic inks that are at least partially transparent to ultraviolet radiation and the one or more photochromic layers each include a water-based ink composition having one or more photochromic inks that undergo a color change upon exposure to ultraviolet radiation.

In another aspect, packages for containing a product therein are provided. In one embodiment, the package includes a flexible container formed from a printed multilayer polymeric film, as described above, in which the flexible container has a front side and a back side sealed together along at least one longitudinal seam and two lateral end seams.

In yet another aspect, methods for fabricating a package for containing a product therein are provided. In one embodiment, the method includes forming a printed multilayer polymeric film, as described above, into a flexible container having a front side and a back side sealed together along at least one longitudinal seam and two lateral end seams.

In another aspect, methods for packaging a product are provided. In one embodiment, the method includes providing a printed multilayer polymeric film, as described above, folding the printed multilayer polymeric film into a tubular form, forming a longitudinal sealed seam by joining opposite longitudinal edges of the tubularly formed printed multilayer polymeric film, forming a first traverse end sealed seam, introducing a product into the tubularly formed printed multilayer polymeric film, and forming a second traverse end sealed seam to enclose the product therein.

In yet another aspect, rolls of flexible film for forming a package for containing a product therein are provided. In one embodiment, the roll of flexible film includes a printed multilayer polymeric film, as described above.

DETAILED DESCRIPTION

Figure 1:
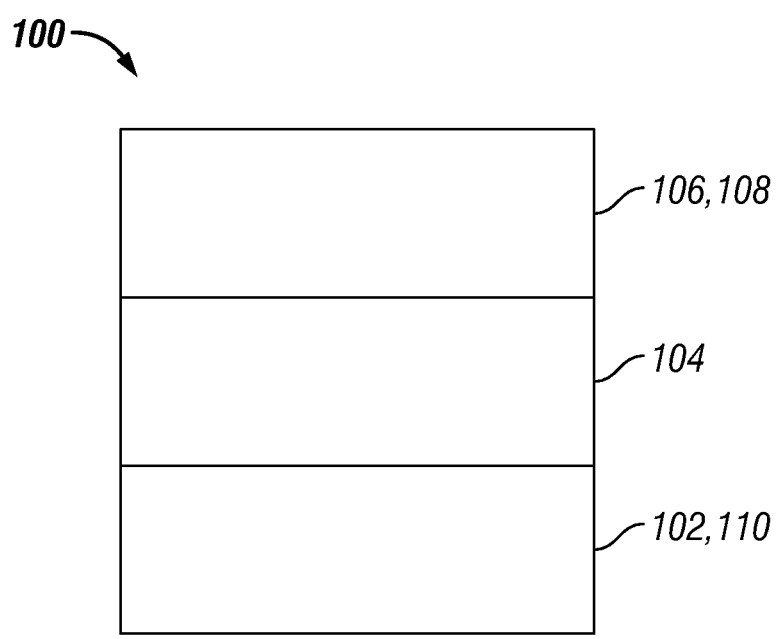
FIG. 1 is a cross-sectional view of a printed multilayer polymeric film in accordance with an embodiment of the present disclosure.

The present invention addresses the challenges that arise when using photochromic inks and non-photochromic inks to form color and graphic schemes on packaging material with conventional printing processes, such as flexographic or rotogravure printing, by providing improved printed multilayer polymeric films and methods of manufacture thereof described herein. Several embodiments of the printed multilayer polymeric films, methods for making these films, packages made from these multilayer polymeric films, methods for fabricating these packages, and methods for packaging products with these packages are described herein. Parameters of different steps, components, and features of the embodiments are described separately, but may be combined consistently with this description of claims, to enable other embodiments as well to be understood by those skilled in the art. Various terms used herein are likewise defined in the description which follows. Concentrations and percent are in weight percent unless the context indicates otherwise.

Printed multilayer polymeric films have been developed that generally include a flexible polymeric film layer, one or more non-photochromic layers, and one or more photochromic layers. In embodiments, the one or more non-photochromic layers each comprise a solvent-based ink composition having one or more non-photochromic inks, and the one or more photochromic layers each comprise a water-based ink composition having one or more photochromic inks.

The compositional make-up of each layer and the printing sequence of the layers of the printed multilayer polymeric film described herein beneficially enable these polymeric films to include viable color and graphic schemes printed thereon with both photochromic water-based inks and non-photochromic solvent-based inks and the capability to form suitable packaging material via existing processing methods, such as printing, extrusion lamination, and like, as well as suitable packages that are capable to withstand existing processing methods, such as the Form-Fill-Seal (FFS) process. That is, the printed multilayer polymeric films disclosed herein advantageously display an improved processing ability to employ both water-based ink compositions and solvent-based ink compositions to form aesthetically suitable color and graphic schemes thereon without sacrificing the performance and manufacturing capabilities of the printed multilayer polymeric film and the packages made therefrom.

Currently, the conventional printing sequence for packaging material that includes water-based photochromic inks printed thereon to form color and graphic schemes includes printing these photochromic inks onto the underlying material first, prior to any other inks, so that the photochromic inks are positioned closest to the outermost surface of the resulting printed packaging material. However, this printing sequence would typically result in the intermingling of subsequent printed non-photochromic solvent-based inks. The printed multilayer polymeric films described herein are formed via a printing sequence in which the solvent-based non-photochromic inks are printed prior to the printing of the water-based photochromic inks, thereby beneficially avoiding intermingling of the inks. This printing sequence also provides the ability to at least partially dry the solvent-based non-photochromic inks prior to printing the water-based photochromic inks.

Printed Multilayer Polymeric Films

In accordance with the description, printed multilayer polymeric films that include aesthetically suitable color and graphic schemes formed from a combination of solvent-based non-photochromic inks and water-based photochromic inks that would not otherwise be possible with conventional printing processes have been developed for the manufacture of packages.

In embodiments, the printed multilayer film includes a flexible polymeric film layer, one or more non-photochromic layers each including a solvent-based ink composition comprising one or more non-photochromic inks, and one or more photochromic layers that include a water-based ink composition comprising one or more photochromic inks.

As used herein, the term "photochromic" when used to modify the type of layer, composition, or ink, means capable of color change upon exposure to ultraviolet radiation.

As used herein, the term "non-photochromic" when used to modify the type of layer, composition, or ink, means incapable of color change upon exposure to ultraviolet radiation.

"Color change" as used herein means a transition from a first color state to a second color state when exposed to ultraviolet radiation. In one embodiment, the first color state is colorless and the second color state is colored. In another embodiment, the first color state is colored and the second color state is colorless. In yet another embodiment, the first color state is colored and the second color state is differently colored.

In some embodiments, the color change is a reversible color change, in which the transition from a first color state to a second color state that occurs upon exposure to ultraviolet radiation subsequently reverts/transposes when the exposure of ultraviolet radiation ceases. In other embodiments, the color change is an irreversible color change, in which the transition from a first color to second color state that occurs upon exposure to ultraviolet radiation is permanent.

In one embodiment, as illustrated in FIG. 1, the printed multilayer polymeric film 100 includes a non-photochromic layer 104 printed onto a flexible polymeric film 102 and a photochromic layer 106 printed onto the non-photochromic layer 104. In this embodiment, the non-photochromic layer 104 is located between the flexible polymeric film 102 and the photochromic layer 106. As a result, the photochromic layer 106 is in the innermost layer 108 and the flexible polymeric film layer 102 is the outermost layer 110 of the of the printed multilayer polymer film 100.

Figure 2:
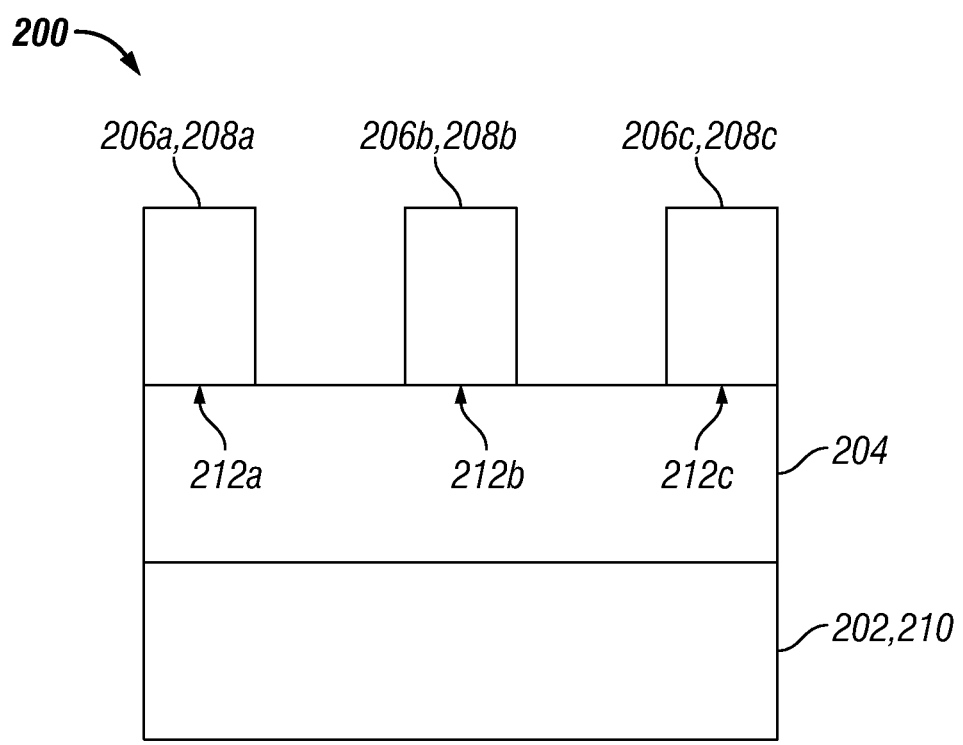
FIG. 2 is a cross-sectional view of a printed multilayer polymeric film in accordance with an embodiment of the present disclosure.

In another embodiment, as illustrated in FIG. 2, a printed multilayer polymeric film 200 includes a non-photochromic layer 204 printed onto the flexible polymeric film 202 and three photochromic layers 206a, 206b, 206c each printed onto corresponding portions 212a, 212b, 212c of the non-photochromic layer 204. In this embodiment, the corresponding portions 212a, 212b, 212c of the non-photochromic layer 204 are located between the flexible polymeric film layer 202 and their respective photochromic layers 206a, 206b, 206c. As a result, the photochromic layers 206a, 206b, 206c are the innermost layers 208a, 208b, 208c and the flexible polymeric film layer 202 is the outermost layer 210 of the printed multilayer polymer film 200.

In embodiments, the printed multilayer polymeric films include a flexible polymeric film layer. As illustrated, for example in FIGS. 1 and 2, the flexible polymeric film layer is the outermost layer of the printed multilayer polymeric film. As used herein "outermost layer" means the first layer that is viewed from the outside of a reverse printed film and will typically be the outermost layer of a package made with such a film. In one embodiment, the flexible polymeric film layer comprises one or more polymers selected from polypropylenes, polyethylenes, polyethylene terephthalates, polyamides, nylons, or combinations thereof. It should be noted that many other polymers, copolymers, and combinations thereof may also be suitable. The materials of the flexible polymer film layer may be produced as a cast or blown film and may be subsequently bi-axially or mono-axially oriented. Further functionality may be added by coating the materials by a vacuum deposition, aqueous deposition, spray process, or other means.

In embodiments, the printed multilayer polymeric films also include one or more non-photochromic layers. The one or more non-photochromic layers each include a solvent-based ink composition that comprises one or more non-photochromic inks. The one or more non-photochromic inks described herein may include any commercially available solvent-based non-photochromic ink. The solvent-based ink compositions described herein may be formed from acetate-based systems, alcohol-based systems, or the like.

In embodiments, the printed multilayer polymeric films also include one or more photochromic inks. The one or more photochromic layers each include a water-based ink composition that comprises one or more photochromic inks that undergo a color change upon exposure to ultraviolet radiation. The one or more photochromic inks described herein may include any commercially available water-based photochromic ink. In one embodiment, the one or more photochromic inks are encapsulated.

In certain embodiments, as illustrated for example in FIGS. 1 and 2, at least a portion of the one or more non-photochromic layers are located between the flexible polymeric film and at least a portion of the one or more photochromic layers, which is contrary to conventional printing sequences (i.e., the photochromic inks are printed closest to the outermost layer of the film to enable the photochromic inks to absorb the greatest amount of incident ultraviolet radiation). As a result, in these particular embodiments, the solvent-based ink composition of each of the one or more non-photochromic layers located between the flexible polymeric film layer and at least a portion of the one or more photochromic layers of the printed multilayer polymeric films described herein are at least partially transparent to ultraviolet radiation, thereby allowing exposure of the one or more photochromic inks to incident ultraviolet radiation.

Figure 3:
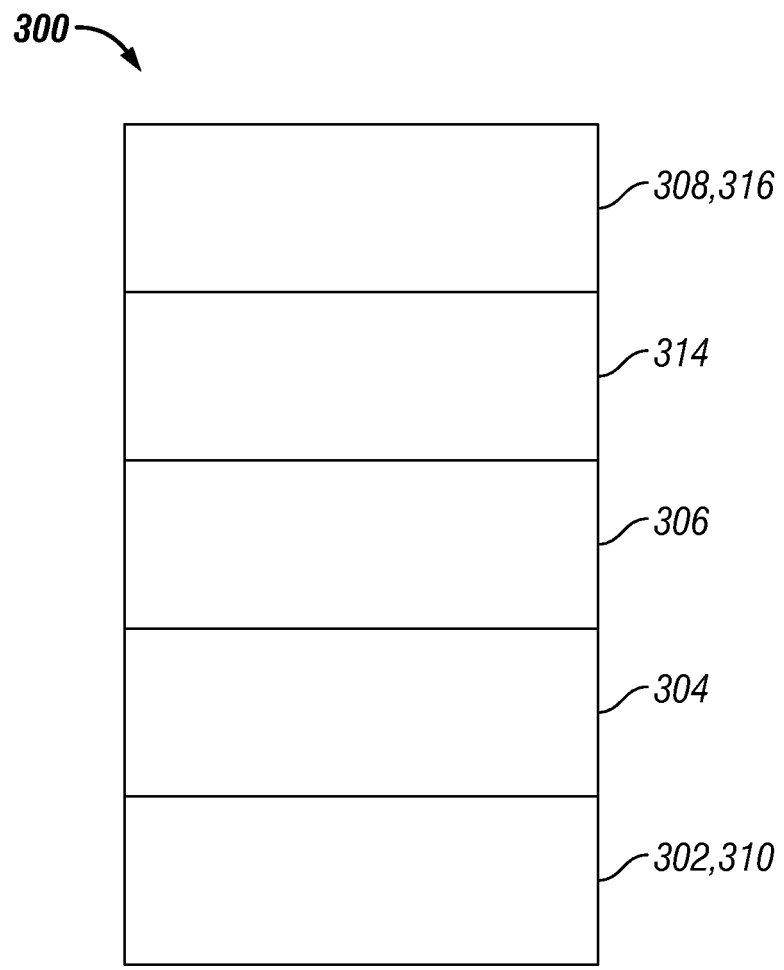
FIG. 3 is a cross-sectional view of a printed multilayer polymeric film in accordance with an embodiment of the present disclosure.

In some embodiments, the printed multilayer polymeric film also includes a resin layer and a base substrate, wherein the resin layer is located between the base substrate and at least one of the one or more photochromic layers and the one or more photochromic layers are between the flexible polymeric film layer and the base substrate. In certain embodiments, the resin layer is an extruded layer which is extruded from a die in sheet form, in which it is soft and tacky when it comes into contact between the layers and base substrate so to bond them together. In one embodiment, as illustrated in FIG. 3, a printed multilayer polymeric film 300 includes a non-photochromic layer 304 printed onto the flexible polymeric film 302 and a photochromic layer 306 printed onto the non-photochromic layer 304. In this embodiment, the non-photochromic layer 304 is located between the flexible polymeric film 302 and the photochromic layer 306. The printed multilayer polymeric film 300 also includes a resin layer 314 and a base substrate 316, in which the resin layer 314 is located between the photochromic layer 306 and the base substrate 316. As a result, the base substrate 316 is the innermost layer 308 and the flexible polymeric film layer 302 is the outermost layer 310 of the of the printed multilayer polymer film 300.

With respect to package made from the printed multilayer polymeric films described herein, the outermost layer of the printed multilayer polymeric film will typically be the layer that is in contact with the environment and the inner most layer will typically be the layer that is in contact with the product contained in the package.

In some embodiments, the base substrate is formed of paper-based materials, polymeric materials, metallized polymeric materials, metallic foils, or combinations thereof.

In some embodiments, the resin layer comprises one or more resin materials selected from random terpolymers, acid-based co-polymers, maleic anhydrides, or combinations thereof. In one embodiment, the one or more resin materials include a random terpolymer in an amount from about 5.0% to about 100.0% based on weight of the resin layer. In another embodiment, the one or more resin materials include a random terpolymer in an amount from about 5.0% to about 75.0% based on weight of the resin layer. In yet another embodiment, the one or more resin materials include a random terpolymer in an amount from about 50.0% to about 75.0% based on weight of the resin layer. In another embodiment, the one or more resin materials include a random terpolymer in an amount from about 50.0% to about 100.0% based on weight of the resin layer and an acid-based co-polymer in amount from about 0.0% to about 50.0% based on weight of the resin layer.

In embodiments where the printed multilayer polymeric films include a resin layer and a base substrate, the resin layer and the at least one of the one or more photochromic layers have, in some embodiments, a print bond strength of about 10 grams/inch or greater there between. In one embodiment, the resin layer and the at least one of the one or more photochromic layers have a print bond strength of about 20 grams/inch or greater there between. In another embodiment, the resin layer and the at least one of the one or more photochromic layers have a print bond strength from about 20 grams/inch to about 50 grams/inch there between.

In embodiments where the printed multilayer polymeric films include a resin layer and a base substrate, the resin layer and the base substrate have, in some embodiments, a back bond strength of about 10 grams/inch or greater there between. In one embodiment, the resin layer and the base substrate have a back bond strength of about 20 grams/inch or greater there between. In another embodiment, the resin layer and the base substrate have a back bond strength from about 20 grams/inch to about 50 grams/inch there between.

Figure 4:
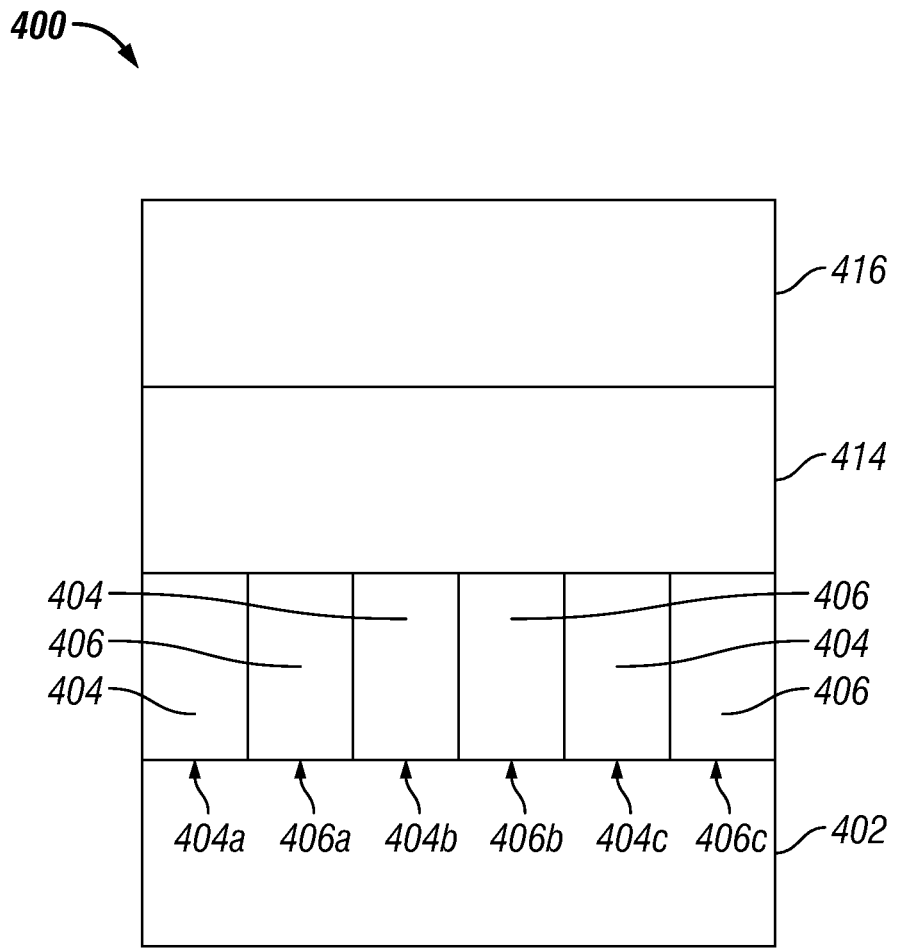
FIG. 4 is a cross-sectional view of a printed multilayer polymeric film in accordance with an embodiment of the present disclosure.

In certain embodiments the one or more non-photochromic layers are applied on one or more portions of the flexible polymeric film layer and the one or more photochromic layers are applied on another one or more portions of the flexible polymeric film layer. In such embodiments, the printed multilayer polymer films also include, in some embodiments, an extruded resin layer and a base substrate, wherein the extruded resin layer is located between the base substrate and the one or more non-photochromic layers and the one or more photochromic layers, and the one or more non-photochromic layers and the one or more photochromic layers are located between the extruded resin layer and the flexible polymeric film layer, as illustrated, for example, in FIG. 4. In FIG. 4, the printed multilayer polymeric film 400 includes a non-photochromic layer 404 printed onto one or more portions 404a, 404b, 404c of a flexible polymeric film layer 402 and a photochromic layer 406 printed onto another one or more portions 406a, 406b, 406c, of the flexible polymeric film 402. The printed multilayer polymeric film 400 also includes an extruded resin layer 414 and a base substrate 416, wherein the extruded resin layer 414 is located between the base substrate 416 and the non-photochromic layer 404 and the photochromic layer 406. In this way, the non-photochromic layer 404 and the photochromic layer 406 are located between the extruded resin layer 414 and the flexible polymeric film layer 402. In one embodiment, the printed multilayer polymeric also includes another one or more non-photochromic layers that each comprise a water-based ink composition having one or more non-photochromic inks, wherein the another one or more non-photochromic layers are located between the extruded resin layer and the one or more non-photochromic layers and the one or more photochromic layers.

In certain embodiments where the printed multilayer polymeric film also includes another one or more non-photochromic layers that each comprise a water-based ink composition having one or more non-photochromic inks, a non-extruded resin layer or aqueous primer layer, instead of an extruded resin layer, may be located between the base substrate and the one or more non-photochromic layers and the one or more photochromic layers.

In other embodiments, a printed multilayer polymeric film includes a flexible polymeric film layer, one or more photochromic layers, a first one or more non-photochromic layers, and a second one or more non-photochromic layers, wherein at least a portion of the one or more photochromic layers are located between the flexible polymeric film layer and at least a portion of the first one or more non-photochromic layers, and the first one or more non-photochromic layers are located between the second one or more non-photochromic layers and the one or more photochromic layers. In such embodiments, the one or more photochromic layers each comprise a photochromic water-based ink composition having one or more photochromic inks that undergo a color change upon exposure to ultraviolet radiation, the first one or more non-photochromic layers each comprise a non-photochromic water-based ink composition having a first one or more non-photochromic inks, and the second one or more non-photochromic layers each comprise a non-photochromic solvent-based composition having a second one or more non-photochromic inks.

The printed multilayer polymeric films described herein may be formed by way of printing and in some embodiments, additional extrusion (e.g., melt extrusion), lamination, or the like, or combinations thereof. Once formed, the printed multilayer polymeric film is either directly fed or first stored as a roll and later fed into a packaging process, such as FFS.

Figure 5:
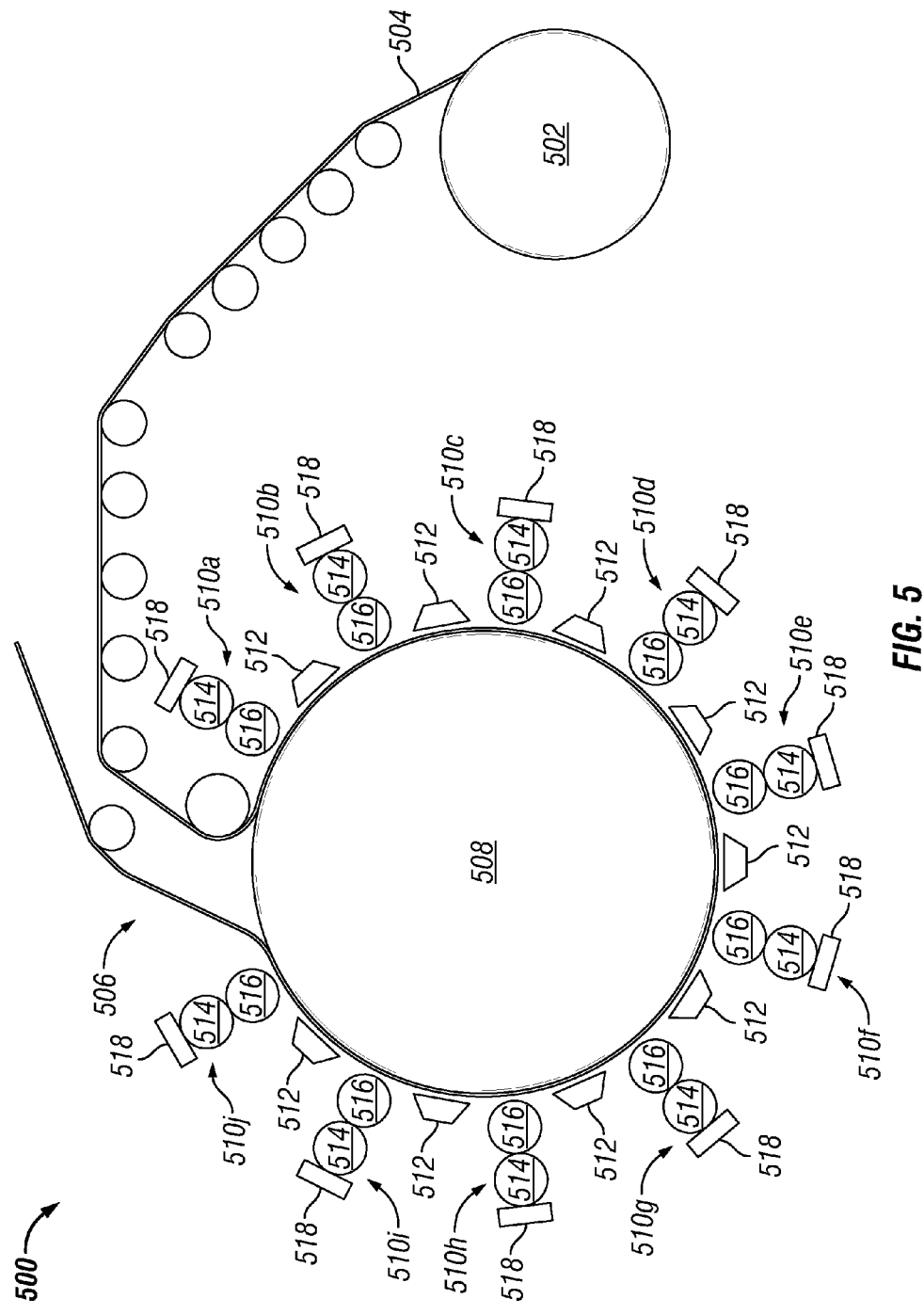
FIG. 5 is a schematic diagram of an exemplary embodiment of a printing process in accordance with the present disclosure.

In one embodiment, as illustrated in FIG. 5, a printed multilayer polymeric film is formed by way of a flexographic printing process 500. In FIG. 5, a rollstock 502 of a flexible polymeric film layer 504 is provided and fed into a flexographic printing press 506 having a cylindrical drum 508 that includes ten printing decks 510a, 510b, 510c, 510d, 510e, 510f, 510g, 510h, 510i, 510j, a dryer 512 after each printing deck so to begin drying the ink that is printed on the flexible polymeric film layer 504 by the previous deck. Each deck includes an anilox roller 514 and a photopolymer plate 516 for printing ink onto the flexible polymeric film layer 504 and a doctor blade 518 that cleans the anilox roller 514 between prints. As the flexible polymeric film layer 502 is fed into the cylindrical drum 506, each deck, in series, prints an ink composition at predetermined areas of the flexible polymeric film layer 502. In this embodiment, the first nine printing decks, 510a, 510b, 510c, 510d, 510e, 510f, 510g, 510h, 510i print solvent-based ink compositions having one or more non-photochromic inks and the tenth printing deck (the last printing deck) 510j prints a water-based ink composition having one or more photochromic inks. This printing sequence beneficially provides the ability to print one or more non-photochromic inks and one or more photochromic inks with minimal, if any, intermingling of inks, thereby producing commercially viable packaging material with aesthetically suitable color and graphic schemes.

In certain embodiments, one or more of the printing decks are empty. For example, in one embodiment, one or more printing decks prior to the printing deck that includes a photochromic water-based ink is empty, such as the ninth printing deck 510i illustrated in FIG. 5. The placement of the empty printing decks among the printing deck sequence of the cylindrical drum advantageously provides more drying time for the non-photochromic solvent-based ink compositions before the photochromic water-based ink compositions are printed so to aid in minimizing potential intermingling of the inks.

In other embodiments, a printed multilayer polymeric film is formed using a main printing process, (e.g. flexographic printing process) and subsequently an outboard station. In this embodiment, the main printing process prints the non-photochromic solvent-based inks on the flexible polymeric film layer, after which the flexible polymeric film layer is then taken to an outboard station wherein the photochromic water-based ink compositions are printed to form the printed multilayer polymeric film. In some embodiments, the printed multilayer polymeric film is formed by way of a two pass printing operation using a flexographic printing process. In one embodiment, the non-photochromic solvent-based ink compositions are printed onto the flexible polymeric film layer during the first printing operation and the photochromic water-based ink compositions are printed during the second printing operation.

In some embodiments, a method for fabricating a printed multilayer polymeric film may include applying one or more non-photochromic layers on a flexible polymeric film layer, the one or more non-photochromic layers each comprising a solvent-based ink composition having one or more non-photochromic inks that are at least partially transparent to ultraviolet radiation, and overlaying one or more photochromic layers on at least a portion of the one or more non-photochromic layers, the one or more photochromic layers each comprising a water-based ink composition having one or more photochromic inks that undergo a color change upon exposure to ultraviolet radiation, wherein at least a portion of the one or more non-photochromic layers are located between the flexible polymeric film and at least a portion of the one or more photochromic layers. In one embodiment, the method may further comprise extruding a resin layer between a base substrate and at least one of the one or more photochromic layers, in which the one or more photochromic layers are between the flexible polymeric film layer and the base substrate.

In other embodiments, a method for fabricating a printed multilayer polymeric film may include applying one or more non-photochromic layers on at least a portion of a flexible polymeric film layer, overlaying one or more photochromic layers on at least another portion of the flexible polymeric film layer, and extruding a resin layer between a base substrate and at least one of the one or more photochromic layers, in which the one or more photochromic layers are located between the flexible polymeric film layer and the base substrate.

Packages and Methods of Manufacture

The printed multilayer polymeric film described herein may be used to form a package for containing a product therein. In certain embodiments, a roll of flexible film comprising a printed multilayer polymeric film described herein may be used to form a package.

Figure 6A:
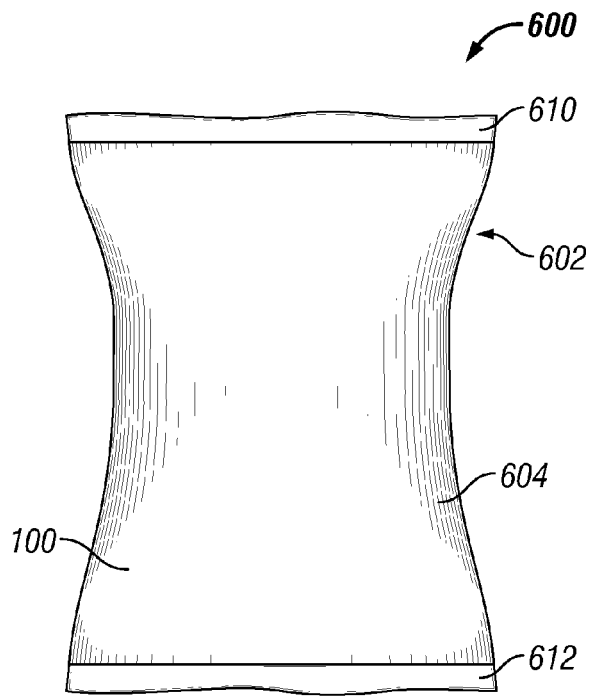
FIG. 6A is a front view of a package formed from the multilayer polymeric material sheet shown in FIG. 1 in accordance with an embodiment of the present disclosure.
Figure 6B:
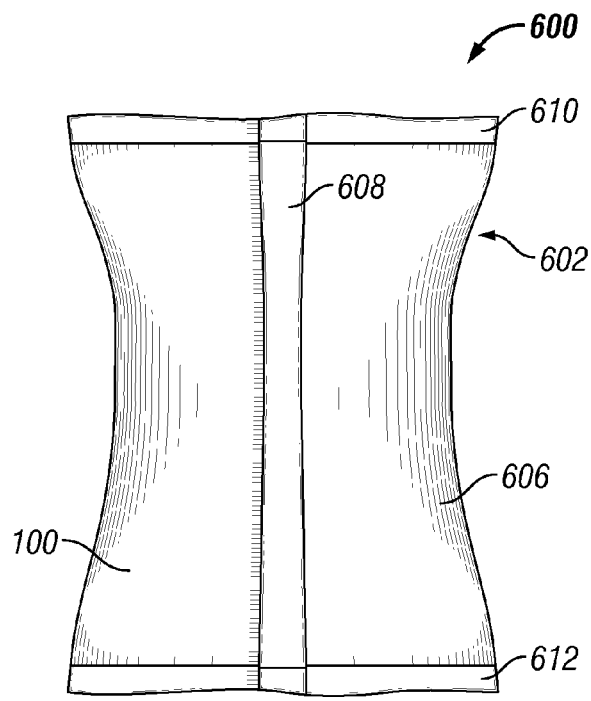
FIG. 6B is a back view of the package shown in FIG. 6A.

As shown in FIGS. 6A and 6B, in one embodiment, a package 600, includes a flexible container 602 formed from the printed multilayer polymeric film 100 of FIG. 1, in which the flexible container 602 has a front side 604 and a back side 606. The front side 604 and the back side 606 are sealed together along at least one longitudinal seam 608 and two lateral end seams 610, 612.

The packages as described herein may be formed from the printed multilayer polymeric film, for example, by a horizontal or vertical FFS process using heat sealing, cold sealing, ultrasonic sealing, radio frequency welding, induction welding or combinations thereof to form the at least one longitudinal seam and the two lateral end seams. In some embodiments, the printed multilayer polymeric films may be constructed of layers of up to about 700 gauge thickness.

The packages are formed from printed multilayer polymeric films described herein that have been developed to include both water-based photochromic ink compositions and solvent-based non-photochromic ink compositions that form aesthetically suitable color and graphic schemes and are suitable for use in typical vertical or horizontal FFS packaging machines. In one embodiment, the method for fabricating a package for containing a product may include forming a printed multilayer polymeric film into a flexible container having a front side and a back side sealed together along at least one longitudinal seam and two lateral end seams. For example, the printed multilayer polymeric film may be fed from a roll and then folded to the desired package shape and stabilized by heat sealing the longitudinal seam and the first of the two lateral end seams. The product may then be placed into the formed package, and the remaining opening, i.e. the second of the two lateral end seams, is sealed. Machines can be configured so that the printed multilayer polymeric film travels horizontally through the machine (horizontal FFS) or vertically through the machine (vertical FFS) for food and non-food production.

Accordingly to some embodiments, the package herein may be used for containing a variety of pourable dry-food products, particularly food products. Non-limiting examples of such products include cereal, chips, crackers, cookies, baked goods, snack foods, and the like.

The packaging of a product in a package formed from printed multilayer polymeric films described herein can be achieved using any suitable packaging method, e.g., FFS. In certain embodiments, the method for packaging a product may include providing a printed multilayer polymeric film, folding the printed multilayer polymeric film into a tubular form, forming a longitudinal sealed seam by joining opposite longitudinal edges of the tubularly formed printed multilayer polymeric film, forming a first traverse end sealed seam, introducing a product into the tubularly formed printed multilayer polymeric film, and forming a second traverse end sealed seam to enclose the product therein.

In embodiments, providing a printed multilayer polymeric film may include forming the printed multilayer polymeric film in off-line or in-line processes with respect to packaging of the product, and also may be formed in both horizontal and vertical FFS operations, among others. For example, the printed multilayer polymeric film may be formed in-line just before the polymeric film is formed into a package body, filled with product, and sealed. Alternatively, the printed multilayer polymeric film may be formed, then wound on a reel, e.g., by a packaging converter, and then loaded into the packaging equipment on which it is then unwound and formed into a package body, filled with product, and sealed.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

It will be appreciated that various above-disclosed and other features and functions, or alternatives thereof, may be desirably combined into many other different products or applications. Various presently unforeseen or unanticipated alternatives, modifications, variations, or improvements therein may be subsequently made by those skilled in the art which are also intended to be encompassed by the following claims.

We claim:

1. A printed multilayer polymeric film, comprising:
a flexible polymeric film layer, wherein the flexible polymeric film layer is the outermost layer of the printed multilayer polymeric film;
one or more non-photochromic layers each comprising a non-aqueous, solvent-based ink composition having one or more non-photochromic inks that are at least partially transparent to ultraviolet radiation;
one or more photochromic layers each comprising a water-based ink composition having one or more photochromic inks that undergo a color change upon exposure to ultraviolet radiation;
a resin layer; and
a base substrate,
wherein the resin layer is located between the base substrate and at least one of the one or more photochromic layers and the one or more photochromic layers are between the flexible polymeric film layer and the base substrate, and wherein at least a portion of the one or more non-photochromic layers are located between the flexible polymeric film layer and at least a portion of the one or more photochromic layers.

2. The printed multilayer polymeric film of claim 1, wherein the one or more photochromic layers are located on one or more portions of the one or more non-photochromic layers.

3. The printed multilayer polymeric film of claim 1, wherein the resin layer and the at least one of the one or more photochromic layers have a print bond strength from about 10 grams/inch to about 50 grams/inch there between.

4. The printed multilayer polymeric film of claim 1, wherein the resin layer and the base substrate have a back bond strength from about 10 grams/inch to about 50 grams/inch there between.

5. A package for containing a product therein, said package comprising:
   a flexible container formed from the printed multilayer polymeric film of claim 1, wherein the flexible container has a front side and a back side sealed together along at least one longitudinal seam and two lateral end seams.

6. The package of claim 5, wherein the printed multilayer polymeric film further comprises a resin layer and a base substrate, wherein the resin layer is located between the base substrate and at least one of the one or more photochromic layers and the one or more photochromic layers are between the flexible polymeric film layer and the base substrate.

7. The package of claim 6, wherein the resin layer and the printed multilayer polymeric film have a print bond strength from about 10 grams/inch to about 50 grams/inch there between.

8. The package of claim 6, wherein the resin layer and the base substrate have a back bond strength from about 10 grams/inch to about 50 grams/inch there between.

9. A method for packaging a product, said method comprising:
   providing the printed multilayer polymeric film of claim 1;
   folding the flexible material sheet into a tubular form;
   forming a longitudinal sealed seam by joining opposite longitudinal edges of the tubularly formed flexible material sheet;
   forming a first traverse end sealed seam;
   introducing a product into the tubularly formed flexible material sheet; and
   forming a second traverse end sealed seam to enclose the product therein.

10. The method of claim 9, wherein the printed multilayer polymeric film further comprises a resin layer and a base substrate, wherein the resin layer is located between the base substrate and at least one of the one or more photochromic layers and the one or more photochromic layers are between the flexible polymeric film layer and the base substrate.

11. A roll of flexible film for forming a package for containing a product therein, said roll of flexible film comprising the multilayer polymeric film of claim 1.

12. The roll of flexible film of claim 11, wherein the multilayer polymeric film further comprises a resin layer and a base substrate, wherein the resin layer is located between the base substrate and at least one of the one or more photochromic layers and the one or more photochromic layers are between the flexible polymeric film layer and the base substrate.

13. The printed multilayer polymeric film of claim 1, wherein the resin layer is an extruded resin layer,
   wherein the one or more non-photochromic layers are each applied on one or more portions of the flexible polymeric film layer,
   wherein the one or more photochromic layers are each applied on one or more portions of the flexible polymeric film layer, and
   wherein the one or more non-photochromic layers and the one or more photochromic layers are located between the extruded resin layer and the flexible polymeric film layer.

14. The printed multilayer polymeric film of claim 13, further comprising another one or more non-photochromic layers that each comprise a water-based ink composition having one or more non-photochromic inks, wherein the another one or more non-photochromic layers are located between the extruded resin layer and the one or more non-photochromic layers and the one or more photochromic layers.

15. The printed multilayer polymeric film of claim 13, wherein the resin layer and the at least one of the one or more photochromic layers have a print bond strength from about 10 grams/inch to about 50 grams/inch there between.

16. The printed multilayer polymeric film of claim 13, wherein the resin layer and the base substrate have a back bond strength from about 10 grams/inch to about 50 grams/inch there between.

17. A package for containing a product therein, said package comprising:
   a flexible container formed from the printed multilayer polymeric film of claim 13, wherein the flexible container has a front side and a back side sealed together along at least one longitudinal seam and two lateral end seams.

18. The package of claim 17, wherein the extruded resin layer and the printed multilayer polymeric film have a print bond strength from about 10 grams/inch to about 50 grams/inch there between.

19. The package of claim 17, wherein the extruded resin layer and the base substrate have a back bond strength from about 10 grams/inch to about 50 grams/inch there between.

20. A roll of flexible film for forming a package for containing a product therein, said roll of flexible film comprising the multilayer polymeric film of claim 13.

21. A method for fabricating a printed multilayer polymeric film, comprising:
   applying one or more non-photochromic layers on a flexible polymeric film layer, the one or more non-photochromic layers each comprising a non-aqueous, solvent-based ink composition having one or more non-photochromic inks that are at least partially transparent to ultraviolet radiation;
   overlaying one or more photochromic layers on at least a portion of the one or more non-photochromic layers, the one or more photochromic layers each comprising a water-based ink composition having one or more photochromic inks that undergo a color change upon exposure to ultraviolet radiation;
   extruding a resin layer between a base substrate and at least one of the one or more photochromic layers,
   wherein the one or more photochromic layers are between the flexible polymeric film layer and the base substrate, and wherein at least a portion of the one or more non-photochromic layers are located between the flexible polymeric film and at least a portion of the one or more photochromic layers, and the flexible polymeric film layer is the outermost layer of the printed multilayer polymeric film.

22. The method of claim 21, wherein the one or more photochromic layers are overlaid onto one or more portions of the one or more non-photochromic layers.

23. The method for fabricating a printed multilayer polymeric film of claim 21, further comprising:
extruding a resin layer between a base substrate and the one or more non-photochromic layers and the one or more photochromic layers,
wherein the one or more non-photochromic layers and the one or more photochromic layers are located between the extruded resin layer and the flexible polymeric film layer.

24. The method of claim 23, wherein the step of overlaying the one or more photochromic layers on at least another portion of the flexible polymeric film layer occurs subsequent to the step of applying one or more non-photochromic layers on at least a portion of a flexible polymeric film layer.

25. The method of claim 23, further comprising applying another one or more non-photochromic layers on the one or more non-photochromic layers and the one or more photochromic ink layers, each of the another one or more non-photochromic layers comprise a water-based ink composition having one or more non-photochromic inks, wherein the other one or more non-photochromic layers are located between the extruded resin layer and the one or more non-photochromic layers and the one or more photochromic layers.

* * * * *